(12) United States Patent
Hao et al.

(10) Patent No.: US 8,805,787 B2
(45) Date of Patent: Aug. 12, 2014

(54) NETWORK ARCHITECTURE FOR CONTENT BACKUP, RESTORING, AND SHARING

(75) Inventors: Jack Jianxiu Hao, Lexington, MA (US); Wei Xia, Sudbury, MA (US); Joseph M. Geiger, Clinton, MA (US); Guanrao Chen, Burlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 482 days.

(21) Appl. No.: 12/609,816

(22) Filed: Oct. 30, 2009

(65) Prior Publication Data
US 2011/0106755 A1    May 5, 2011

(51) Int. Cl.
*G06F 17/30* (2006.01)

(52) U.S. Cl.
USPC .......................................................... 707/640

(58) Field of Classification Search
CPC ............ G06F 11/1456; G06F 11/1469; G06F 11/1458
USPC .......................... 707/640, 652, 661, 674, 679
See application file for complete search history.

(56) References Cited

U.S. PATENT DOCUMENTS

| | | | |
|---|---|---|---|
| 7,518,983 B2 * | 4/2009 | Yokota et al. | 370/216 |
| 7,584,339 B1 * | 9/2009 | Bingham et al. | 711/162 |
| 7,725,669 B1 * | 5/2010 | Bingham et al. | 711/162 |
| 7,882,073 B1 * | 2/2011 | Ojalvo | 707/654 |
| 8,497,895 B2 * | 7/2013 | Ferdinand | 348/14.08 |
| 2004/0107125 A1 * | 6/2004 | Guheen et al. | 705/7 |
| 2004/0221207 A1 * | 11/2004 | Yokota et al. | 714/48 |
| 2006/0015545 A1 * | 1/2006 | Ezra | 707/204 |
| 2006/0161635 A1 * | 7/2006 | Lamkin et al. | 709/217 |
| 2007/0201502 A1 * | 8/2007 | Abramson | 370/429 |
| 2008/0141091 A1 * | 6/2008 | Kalluri | 714/748 |

* cited by examiner

*Primary Examiner* — Hung T Vy

(57) ABSTRACT

A method may include generating a list of current files stored in a user device, wherein the list of current files includes unique file identifiers, each associated with a corresponding one of the current files. The method may further include sending the list of current files from the user device to a network device and receiving a copy list from the network device in the user device. The copy list may be generated by comparing the list of current files to a list of previously copied files, and the list of previously copied files may include unique file identifiers, each associated with a different one of the previously copied files. The method may include sending the files listed in the copy list from the user device to the network device.

25 Claims, 18 Drawing Sheets

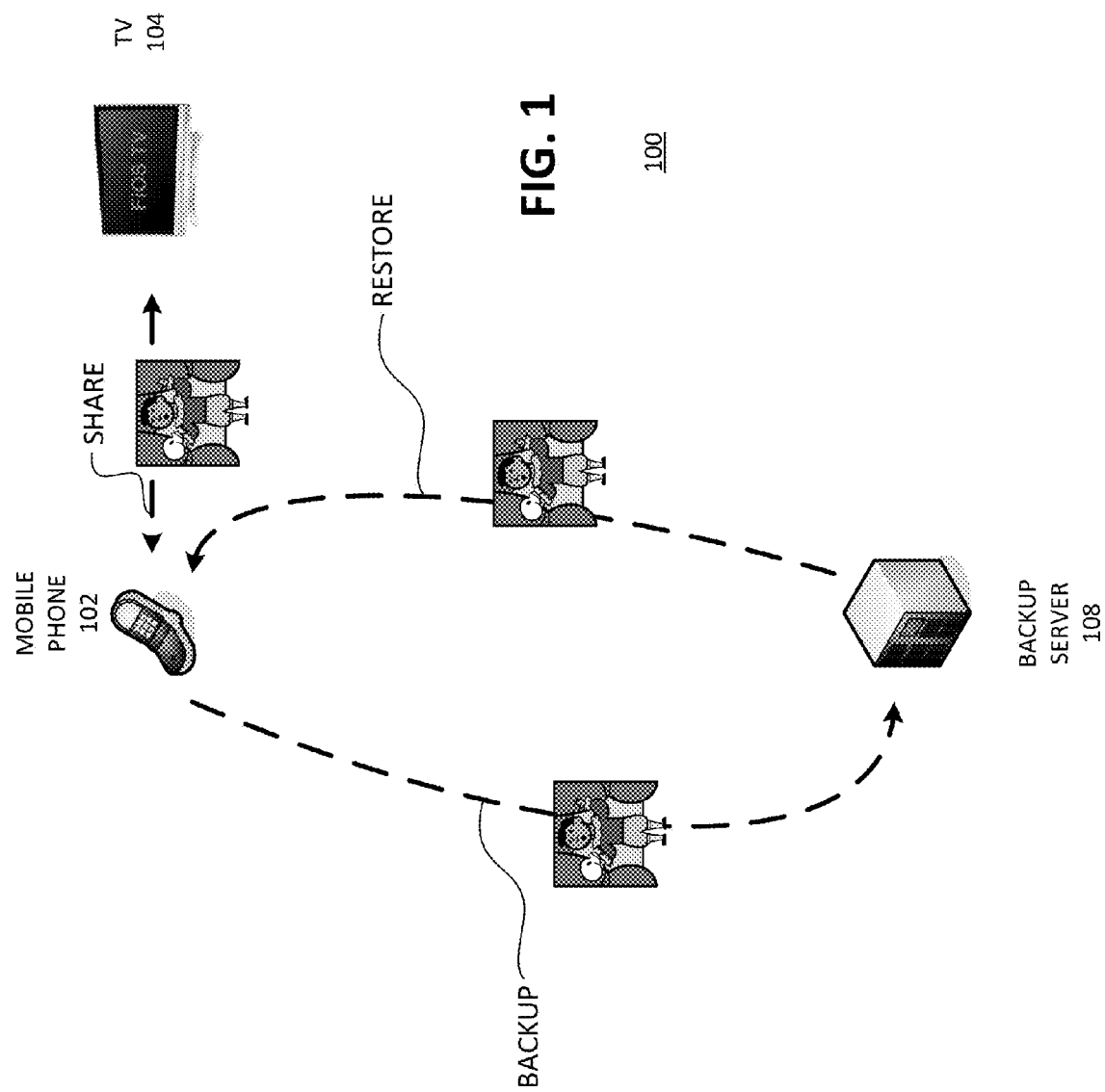

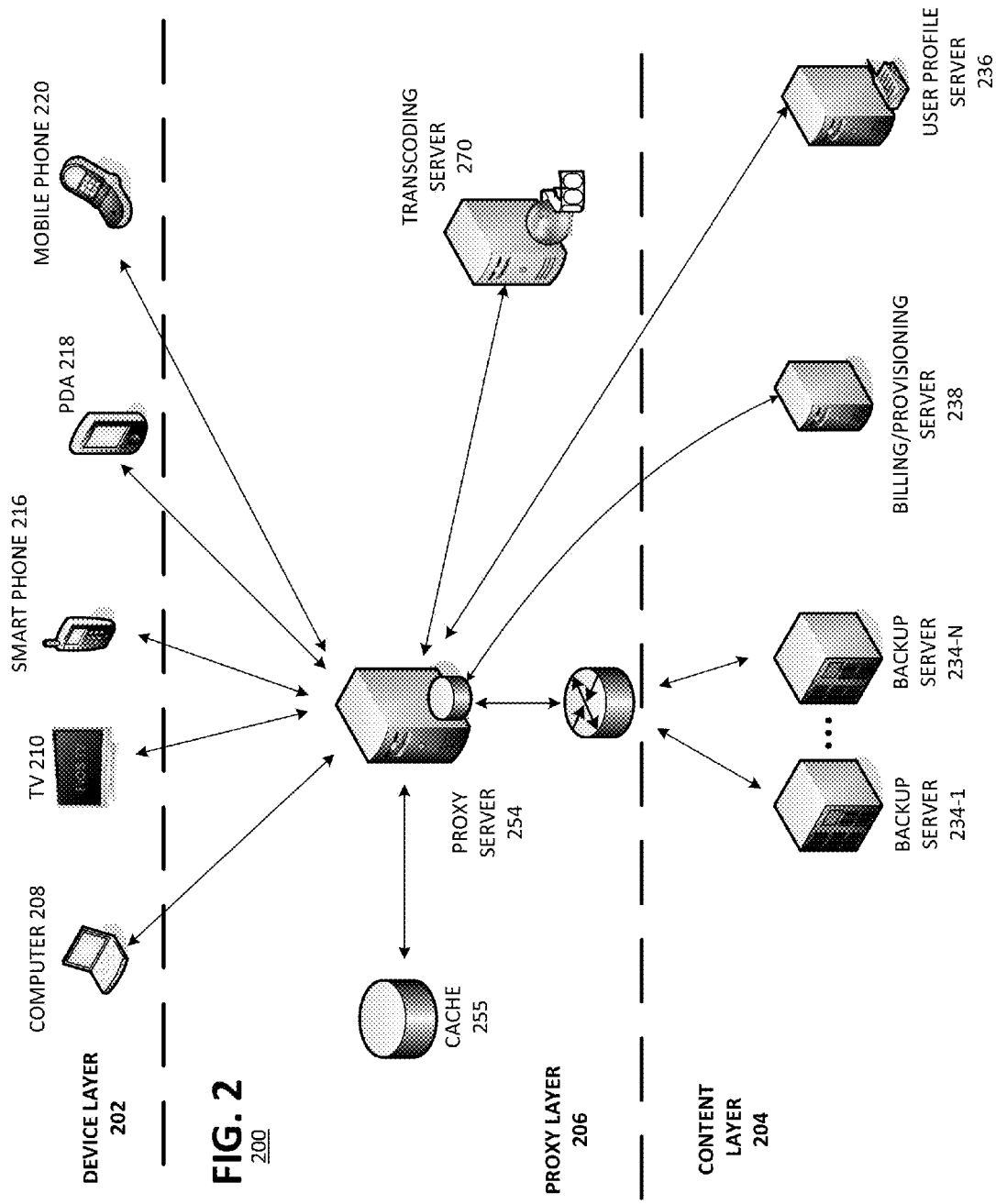

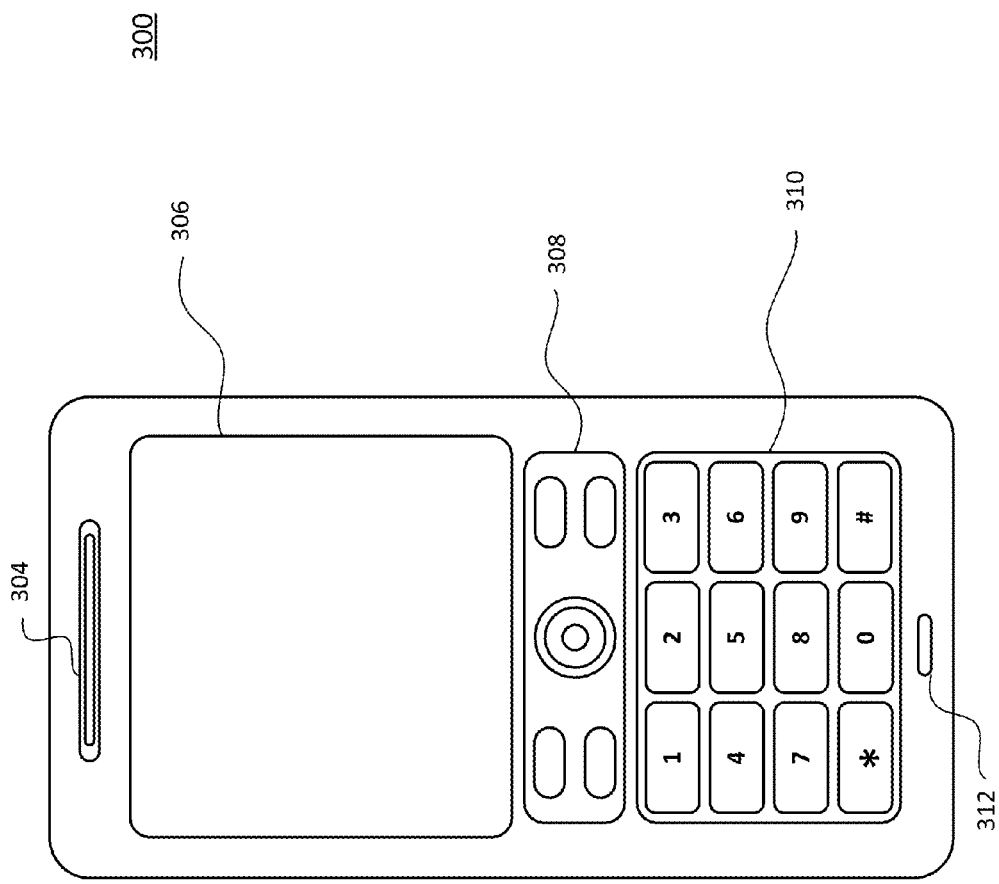

| CURRENT LIST 464 | |
| --- | --- |
| FILENAME 402 | FILE ID 404 |
| PHOTO1.JPG | 86542 |
| PHOTO2.JPG | 69823 |
| PHOTO3.JPG | 69854 |

FIG. 4B

| BACKUP LIST 466 | |
| --- | --- |
| FILENAME 402' | FILE ID 404' |
| PHOTO2.JPG | 69823 |
| PHOTO3.JPG | 69854 |

FIG. 4C

| RESTORE LIST 468 | |
| --- | --- |
| FILENAME 402" | FILE ID 404" |
| PHOTO4.JPG | 45612 |
| PHOTO5.JPG | 56123 |

FIG. 4D

CURRENT DEVICE LIST 564

| DEVICE NUMBER 501 | FILENAME 502 | FILE ID 504 |
|---|---|---|
| 202.251.0808 | PHOTO1.JPG | 86542 |
| 202.251.0808 | PHOTO2.JPG | 69823 |
| 202.251.0809 | PHOTO3.JPG | 69854 |
| 202.251.0809 | STAR TREK.MOV | 69860 |

PREVIOUS DEVICE LIST 566

| DEVICE NUMBER 501' | FILENAME 502' | FILE ID 504' |
|---|---|---|
| 202.251.0808 | PHOTO1.JPG | 86542 |
| 202.251.0809 | STAR TREK.MOV | 69860 |

| GLOBAL FILE LIST 568 | |
|---|---|
| FILE ID 512 | FILE LOCATION 514 |
| 86542 | [***] |
| 69823 | [***] |
| 69854 | [***] |
| 69860 | [***] |

BACKUP LIST 466'

| FILENAME 402' | FILE ID 404' |
|---|---|
| PHOTO2.JPG | 69823 |

FIG. 8B

PREVIOUS DEVICE LIST 566'

| DEVICE NUMBER 501' | FILENAME 502' | FILE ID 504' |
|---|---|---|
| 202.251.0808 | PHOTO1.JPG | 86542 |
| | PHOTO3.JPG | 69854 |
| 202.251.0809 | STAR TREK.MOV | 69860 |

RESTORE LIST 468'

| FILENAME 402" | FILE ID 404" |
|---|---|
| PHOTO5.JPG | 56123 |

FIG. 11B

PREVIOUS DEVICE LIST 566"

| DEVICE NUMBER 501' | FILENAME 502' | FILE ID 504' |
|---|---|---|
| 202.251.0808 | PHOTO1.JPG | 86542 |
| | PHOTO2.JPG | 69854 |
| | PHOTO3.JPG | 86542 |
| | PHOTO4.JPG | 45612 |
| | PHOTO5.JPG | 56123 |
| 202.251.0809 | STAR TREK.MOV | 69860 |

PREVIOUS DEVICE LIST 1302

| DEVICE NUMBER 501 | FILENAME 502 | FILE ID 504 |
|---|---|---|
| 202.251.0808 | PHOTO1.JPG | 86542 |
| | PHOTO2.JPG | 69823 |
| | PHOTO3.JPG | 69854 |
| 202.251.0809 | PLAY.MOV | 69823 |
| | STAR TREK.MOV | 69854 |

PREVIOUS DEVICE LIST 1302'

| DEVICE NUMBER 501 | FILENAME 502 | FILE ID 504 |
|---|---|---|
| 202.251.0808 | PHOTO1.JPG | 86542 |
| | PHOTO2.JPG | 69823 |
| | PHOTO3.JPG | 69854 |
| | PLAY.MOV | 69823 |
| | STAR TREK.MOV | 69854 |
| 202.251.0809 | PLAY.MOV | 69823 |

1400

US 8,805,787 B2

NETWORK ARCHITECTURE FOR CONTENT BACKUP, RESTORING, AND SHARING

BACKGROUND INFORMATION

Laptop and mobile phone users have become accustomed to creating, viewing, and sharing content (e.g., photos and videos). Such devices, however, may break, be replaced, or become lost, thus jeopardizing the content stored in the devices. Sometimes users accidently delete content, further jeopardizing the content stored in the devices.

BRIEF DESCRIPTION OF THE DRAWINGS

FIG. 1 is a diagram of an exemplary environment in which embodiments described below may be implemented;

FIG. 2 shows an exemplary network in which embodiments described herein may be implemented;

FIG. 3 is a block diagram of an exemplary user device;

FIGS. 4B through 4C are diagrams of exemplary data structures stored in the client computing module of FIG. 4A;

FIGS. 5B through 5D are diagrams of exemplary data structures stored in the server computing module of FIG. 5A;

FIGS. 8A and 8B are a diagrams of exemplary data structures stored in the devices of FIG. 2;

FIGS. 11A and 11B are a diagrams of exemplary data structures stored in the devices of FIG. 2;

FIG. 13 is a diagram of exemplary data structures stored in the devices of FIG. 2.

DETAILED DESCRIPTION OF PREFERRED EMBODIMENTS

Figure 4A:
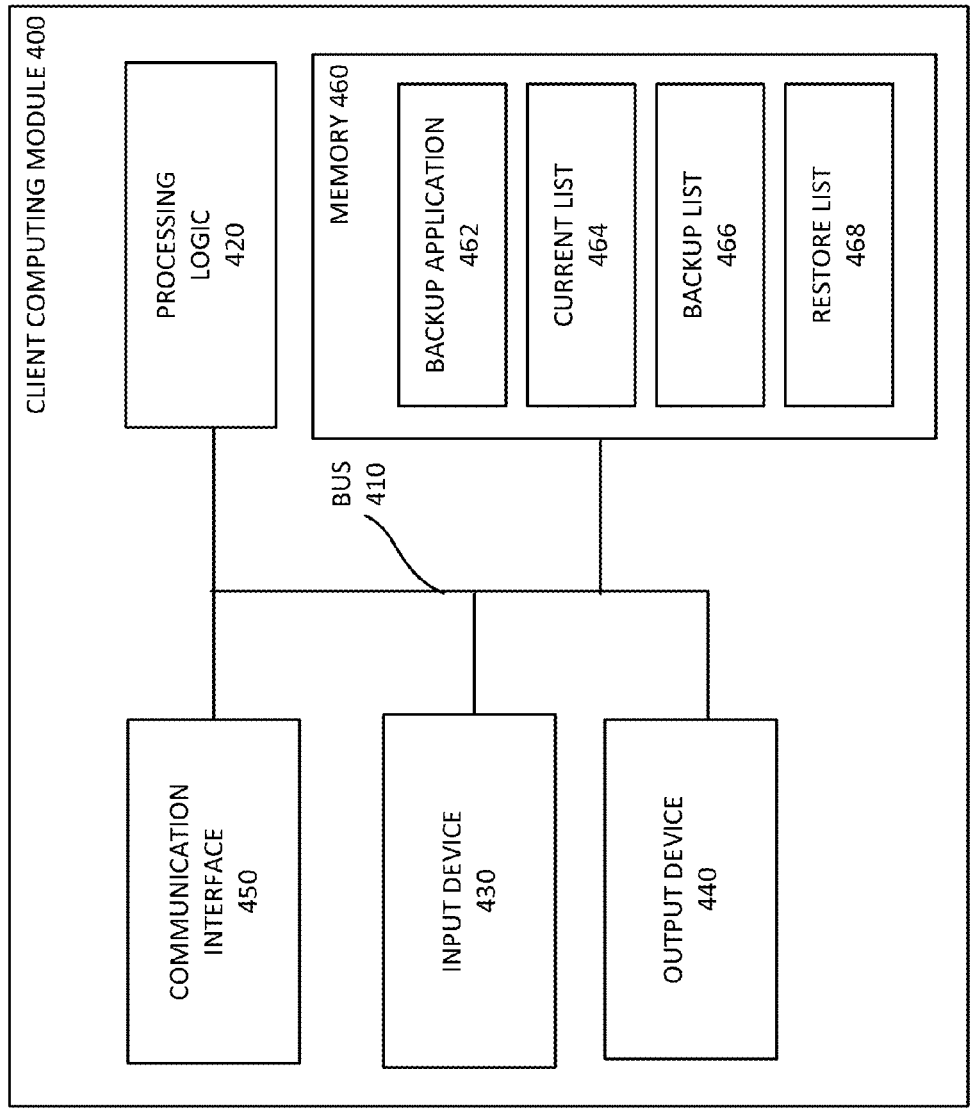
FIG. 4A is a block diagram of exemplary components of a client computing module.

The following detailed description refers to the accompanying drawings. The same reference numbers in different drawings may identify the same or similar elements. Also, the following detailed description does not limit the invention.

FIG. 1 is a diagram of an exemplary environment 100 in which embodiments described below may be implemented. Environment 100 includes a mobile phone 102, a television (TV) 104, and a backup server 108. The user of mobile phone 102 may store content (e.g., photos and/or videos) on mobile phone 102. Mobile phone 102, however, may break, be replaced, or become lost, thus jeopardizing the content stored in phone 102. Sometimes the user of mobile phone 102 may accidently delete content, further jeopardizing the content stored in phone 102. One or more embodiments disclosed herein may allow for the user to backup content to backup server 108. In the event of lost content, for example, one embodiment may allow the user to restore the content from backup server 108 to mobile phone 102. In another embodiment, the user may share content between devices, such as sharing content between mobile phone 102 and TV 104. Further, in one embodiment as described below, content may be backed up and/or shared in a system with a distributed, scalable architecture.

FIG. 1 is a simplified configuration of one exemplary environment. Other environments may include more devices or a different arrangement of devices. For example, FIG. 2 shows an exemplary network 200 in which embodiments described herein may be implemented. As shown, network 200 may include a device layer 202, a content layer 204, and a proxy layer 206. Proxy layer 206 may lie between device layer 202 and content layer 204 and may facilitate the exchange of messages (e.g., communications) between device layer 202 and content layer 204. Proxy layer 206 may also be referred to as "device proxy layer 206."

Device layer 202 may include, for example, a computer 208, a television (TV) 210, a smart phone 216 (e.g., a Blackberry™, a Palm Pre™, an HTC Dream™, etc.), a Personal Digital Assistant (PDA) 218, a mobile phone 220, and/or another type of communication device. Any of devices 208-220 may be considered "user devices." Computer 208 may include a laptop, desktop, or any other type of computing device. Computer 208 may include a browser application program for navigating a network, such as a public or private Internet or any other type of public or private network.

TV 210 may include a device capable of receiving and reproducing video and audio signals, e.g., a video display device. TV 210 may include a liquid crystal display (LCD), a cathode ray tube (CRT), a plasma display, etc. TV 210 may be associated with a set-top box (STB) (not shown). The STB may include a computer device, such as a cable card, for hosting programs, databases, and/or applications. In one embodiment, TV 210 may include the STB in the same housing. TV 210 and/or the STB may include an application, such as digital video recorder (DVR) application or a browser application for navigating a network, such as a public or private Internet or any other type of public or private network. TV 210 and/or the STB may be associated with a remote control (not shown) that includes control keys to navigate menus displayed on TV 210, for example, and to otherwise control functions of TV 210 and/or the STB.

Smart phone 216, PDA 218, and/or mobile phone 220 may allow a user to place telephone calls to other user devices. Smart phone 216, PDA 218, and/or mobile phone 220 may communicate with other devices via one or more communication towers (not shown) using a wireless communication protocol, e.g., GSM (Global System for Mobile Communications), CDMA (Code-Division Multiple Access), WCDMA (Wideband CDMA), GPRS (General Packet Radio Service), EDGE (Enhanced Data Rates for GSM Evolution), etc. In one embodiment, smart phone 216, mobile phone 220, and/or PDA 218 may communicate with other devices through a wireless local network using WiFi (e.g., IEEE 802.11x).

In other embodiments, devices 208-220 may also communicate with other devices via a wired network. For example, smart phone 216, mobile phone 220, and PDA 218 may communicate with other devices using a public-switched telephone network (PSTN) or the Ethernet protocol. Devices 208-220 may include an application, such as a browser application for navigating a network, such as a public or private Internet or any other type of public or private network. Applications for devices 208-220 may include Java™ applications (e.g., Java Micro Edition or J2ME), BREW (Binary Runtime Environment for Wireless) applications, or applications written in any other type of language.

Content layer 204 may include backup servers 234-1 through 234-N (collectively "backup servers 234," individually "backup server 234-x"), a user profile server 236, and a billing/provisioning server 238. Backup servers 234 may include a database to store content for backing up or sharing content on user devices. Content may include, for example, videos, photographs, news, and/or television broadcasts (e.g., NBC™, CBS™, ABC™, and Fox™). Content stored in backup server 234-x may be identified and/or addressed by any type of addressing scheme, including a URL (Universal Resource Locator), a URI (Universal Resource Indicator), a CID (a Content Identifier or content ID), or a RID (Resource Identifier or Resource ID). In one embodiment, content stored in backup server 234-x may be addressed using a (URI) or a universal unique identifier (UUID or UID). In this embodiment, each unique piece of content may be addressed by a unique identifier and identical content may have the same UID. In one embodiment, the UID is a hash value of the content.

User profile server 236 may include a database of user names, addresses, and/or corresponding device numbers (e.g., phone numbers, mobile device numbers, URIs, URLs). User profile server 236 may store a database of information associating user names, device numbers, subscribed services and features, account commentary, account numbers, etc. Billing/provisioning server 238 may establish user accounts and may record account usage and accordingly generate a bill for a customer.

Proxy layer 206 may include a proxy server 254, a cache database 255 ("cache 255"), and a transcoding server 270. Proxy server 254 may receive communications from one or more user devices 208-220 for forwarding to other devices. Proxy server 254 may also authenticate user devices (e.g., user devices 208-220). Proxy server 254 may communicate with devices (e.g., user devices 208-220) using secure channels implementing, for example, SSL (Secure Socket Layer) protocols or TLS (Transport Layer Security) protocols. Cache 255 may include a database to store content on a temporary basis on behalf of proxy server 254, for example.

Transcoding server 270 may convert an audio, video, or graphic files from one format to another (e.g., from one bit rate to another bit rate, from one resolution to another, from one standard to another, from one file size to another, etc.). Transcoding server 270 may allow different audio, video, and/or graphic files to be displayed or played on any device in network 200. Examples of audio formats include MP3, WMA (Windows Media Audio), AAC (Advanced Audio Coding), QCP (Qualcomm Code Prediction), AMR (Adaptive Multi-Rate), Ogg Vorbis, etc. Examples of video formats include MPEG-2 (Motion Picture Expert Group 2), MPEG-4 (Motion Picture Expert Group 4), and Ogg Theora. Transcoding server 270 may convert an audio or video file from any of these formats into any other one of these formats, for example, or into the same format but at a different bit rate, resolution, size, etc.

Any of the devices in network 200 (e.g., cache 255, proxy server 254, or transcoding server 270) may include one or more computer systems for hosting programs, databases, and/or applications. For example, cache 255, proxy server 254, or transcoding server 270 may each include a cluster of servers that may be geographically diverse. Such a cluster of servers may provide for scalability, load balancing, and reliability. Regarding scalability, as the number of users that subscribe to the services provided by backup servers 234 increases, for example, the extra load may be borne by adding additional cache, proxy servers, transcoding servers, etc. rather than replacing existing servers. Regarding load balancing, as requests for services are received, for example, these requests may be distributed across the different servers in the cluster. For load balancing, a cluster may include a router for sending requests, for example, to the different servers. Regarding reliability, for example, if one of the servers in the cluster should fail, for example, the remaining servers in the cluster may provide uninterrupted (or near uninterrupted) services provided for by the cluster.

As shown in FIG. 2 and describe above, network 200 may include three layers (e.g., device layer 202, proxy layer 206, and content layer 204), which may facilitate recovery and/or uninterrupted service (e.g., no loss of data, minimal down time) in the event of system failure in the middle layer (e.g., proxy layer 206). The three layers may also allow for recovery and/or uninterrupted service in the event of system failure in the other two layers (e.g., the device layer 202 and/or the content layer 204). In one embodiment, proxy layer 206 may be a state-less and/or memory-less layer that passes information without storing state. In other embodiments, proxy layer 206 may store information on a temporary or permanent (e.g., redundant) basis, however, for other reasons, such as improved performance. In one embodiment, if proxy layer 206 (or part of proxy layer 206) fails or loses data, the data may be reconstituted or received from device layer 202 or content layer 204 as a new proxy layer takes hold. In one embodiment, requests between device layer 202 and proxy layer 206 and between content layer 204 and proxy layer 206 may include a state-less protocol, such as HTTP, to facilitate a state-less service proxy layer 206.

Because proxy layer 206 may, in one embodiment, be state-less, data requests between the device layer 202 and proxy layer 206 and between content layer 204 and proxy layer 206 may include state parameters. For example, a data request from device layer 202 to proxy layer 206 may include state parameters such as a session cookie, a device number, a password, a request, etc. In one embodiment, states may be permanently stored in device layer 202 (e.g., devices 208-220) or content layer 204 (e.g., one of backup servers 234). In another embodiment, state parameters may be only temporarily stored in device layer 202 and/or content layer 204. A state-less proxy layer 206 may allow for more efficient load-balancing of the data requests received in proxy layer 206. For example, data requests may be distributed more efficiently among different servers in a cluster. A state-less proxy layer 206 may also allow for the handing off a user device from one proxy to another as a user device travels from one cell in a network to another, for example.

In other embodiments, network 200 may include more, fewer, or different devices. Moreover, one or more devices 208-270 may perform one or more functions of any other device in network 200. Furthermore, one or more of devices 208-270 may be remotely located from each other, e.g., devices 208-270 may be geographically diverse. Although FIG. 2 shows devices 208-270 coupled to each other in a particular configuration, devices 208-270 may also be arranged in other configurations, either coupling directly with each other or through one or more networks, such that any one of devices 208-270 may communicate with any other one of devices 208-270. Devices 208-270 may communicate with any other one of devices 208-270 through the Internet, an ad hoc network, a local area network (LAN), a wide area network (WAN), a metropolitan area network (MAN), a cellular network, a PSTN, a high-speed fiber optic network (e.g., FiOS™), or any other network or combinations of networks.

As discussed above, user devices in network 200 may include computer 208, TV 210, smart phone 216, PDA 218, or mobile phone 220, for example. FIG. 3 is diagram of an exemplary user device 300, such as mobile phone 220. As illustrated, user device 300 may include a speaker 304, a display 306, control keys 308, a keypad 310, and a microphone 312. User device 300 may include other components (not shown in FIG. 3) that aid in receiving, transmitting, and/or processing data. Moreover, other configurations of user device 300 are possible.

Speaker 304 may provide audible information to a user of user device 300. Display 306 may include a display screen to provide visual information to the user, such as video images or pictures, and may include a touch-screen display to accept inputs from the user. For example, display 306 may provide information regarding incoming or outgoing telephone calls, telephone numbers, contact information, current time, voicemail, email, etc. Display 306 may display the GUIs shown in FIGS. 1B-1D, for example.

Control keys 308 may permit the user to interact with user device 300 to cause user device 300 to perform one or more operations, such as interacting with a backup, sharing, or copying application. Control keys 308 may include soft keys that may perform the functions indicated on display 306 directly above the keys. Keypad 310 may include a standard telephone keypad and may include additional keys to enable inputting (e.g., typing) information into user device 300. Microphone 312 may receive audible information from the user.

FIG. 4A is a block diagram of exemplary components of a client computing module 400. User devices 208-220 may each include one or more computing modules 400. Client computing module 400 may include a bus 410, processing logic 420, an input device 430, an output device 440, a communication interface 450, and a memory 460. Client computing module 400 may include other components (not shown) that aid in receiving, transmitting, and/or processing data. Moreover, other configurations of components in client computing module 400 are possible.

Bus 410 may include a path that permits communication among the components of client computing module 400. Processing logic 420 may include any type of processor or microprocessor (or groups of processors or microprocessors) that interprets and executes instructions. In other embodiments, processing logic 420 may include an application-specific integrated circuit (ASIC), a field-programmable gate array (FPGA), or the like.

Input device 430 may include a device that permits a user to input information into client computing module 400, such as a keyboard (e.g., control keys 308 and/or keypad 310), a mouse, a pen, a microphone (e.g., microphone 312), a remote control, a touch-screen display (e.g., display 306), etc. Output device 440 may include a device that outputs information to the user, such as a display (e.g., display 306), a printer, a speaker (e.g., speaker 304), etc. Output device 440 may also include a vibrator to alert a user.

Input device 430 and output device 440 may allow the user to activate a particular service or application, such as a browser application. Input device 430 and output device 440 may allow the user to receive and view a menu of options and select from the menu options. The menu may allow the user to select various functions or services associated with applications executed by client computing module 400.

Communication interface 450 may allow client computing module 400 to communicate with other devices and/or systems. Communication interface 450 may include a transmitter that may convert baseband signals to radio frequency (RF) signals and/or a receiver that may convert RF signals to baseband signals. Communication interface 450 may include a transceiver to perform functions of both a transmitter and a receiver. Communication interface 450 may be coupled to an antenna for transmission and reception of the RF signals. Communications interface 450 may include a network interface card, e.g., Ethernet card, for wired communications or a wireless network interface (e.g., a WiFi) card for wireless communications. Communication interface 450 may also include, for example, a universal serial bus (USB) port for communications over a cable, a Bluetooth™ wireless interface for communicating with Bluetooth™ devices, a near-field communication (NFC) interface, etc. Communication interface 450 may implement a wireless communication protocol, e.g., GSM, CDMA, WCDMA, GPRS, EDGE, etc. Communications interface 450 may also receive, transmit and/or process digital or analog audio inputs/outputs and/or digital or analog video inputs/outputs.

Memory 460 may include a random access memory (RAM) or another type of dynamic storage device that may store information and instructions, e.g., an application, for execution by processing logic 420; a read-only memory (ROM) device or another type of static storage device that may store static information and instructions for use by processing logic 420; and/or some other type of magnetic or optical recording medium and its corresponding drive, e.g., a hard disk drive (HDD), for storing information and/or instructions.

Memory 460 may include a backup application 462 and data tables, e.g., current list 464, backup list 466, and restore list 468. Backup application 462 may, for example, copy files stored in the device to backup server 234-x or restore files to the device from backup server 234-x. Current list 464 may list the current files stored in client computing module 400. Backup list 466 may list the files that client computing module 400 is to copy to backup server 234-x. Backup list 466 may also be referred to as a copy list. Restore list 468 may list the files that client computing module 400 is to restore from backup server 234-x.

Client computing module 400 may perform certain operations or functions, as described below. Client computing module 400 may perform these operations or functions in response to processing logic 420 executing software instructions contained in a computer-readable medium, such as memory 460. A computer-readable medium may include a physical or logical memory device. The software instructions may be read into memory 460 from another computer-readable medium or from another device via communication interface 450. The software instructions contained in memory 460 may cause processing logic 420 to perform processes that are described below.

FIGS. 4B through 4D are diagrams of exemplary data structures stored in the client computing module 400, e.g., current list 464, backup list 466 and restore list 468. FIG. 4B is a diagram of an exemplary current list 464. Current list 464 may store information related to files currently stored in a device. In one embodiment, each entry (e.g., record) in list 464 may include information regarding a different file. Current list 464 may be stored in any of devices 208-220. For example, if current list 464 is stored in mobile phone 220, then the list may store information related to files in mobile phone 220. A copy of current list 464 may also be stored in other devices shown in network 200.

Current list 464 may include a filename field 402 and a file ID field 404. Filename field 402 may identify the name of a file stored in the user device, such as mobile phone 220.

Referring to FIG. 4B, current list 464 lists three filenames: photo1.jpg, photo2.jpg, and photo3.jpg.

File ID field 404 may identify or address the file specified in filename field 402. In one embodiment, file ID field 404 may specify a hash value (e.g., MD5 (Message Digest version 5), SHA1 (Secure Hash Algorithm version 1), or SHA2 (Secure Hash Algorithm version 2)) of the file identified in filename field 402. In one embodiment, file ID field 404 may uniquely identify the file in filename field 402, but identical files may have the same file ID. That is, file ID field 404 may identify multiple instances of the same file (e.g., identical files) because, in one embodiment, multiple instances of the same file (e.g., identical files) have the same file ID (e.g., the same MD5, SHA1, SHA2, etc). Referring to FIG. 4B, three file IDs are listed: 86542 for photo1.jpg, 69823 for photo2.jpg, and 69854 for photo3.jpg. These values are exemplary and in some implementations may be very long alphanumeric strings.

As mentioned with respect to FIG. 4A, memory 460 may also include a backup list 466. FIG. 4C is a diagram of an exemplary backup list 466. Backup list 466 may store information related to files to be copied from a device to backup server 234-x. In one embodiment, each entry (e.g., record) in list 466 may include information regarding a different file. Backup list 466 may be stored in any of devices 208-220. For example, if backup list 466 is stored in mobile phone 220, then the list may store information related to files in mobile phone 220. A copy of backup list 466 may also be stored in other devices shown in network 200.

Backup list 466 may include a filename field 402' and a file ID field 404'. Filename field 402' and file ID field 404' may store information similar to filename field 402 and file ID field 404 in current list 464, described above. Referring to FIG. 4C, backup list 466 lists two filenames: photo2.jpg and photo3.jpg and corresponding file IDs of 69823 and 69854. As mentioned above, backup list 466 may be referred to as copy list 466.

As mentioned with respect to FIG. 4A, memory 460 may also include a restore list 468. FIG. 4D is a diagram of an exemplary restore list 468. Restore list 468 may store information related to files to be copied from a backup server 234-x to a user device. In one embodiment, each entry (e.g., record) in list 468 may include information regarding a different file. Restore list 468 may be stored in any of devices 208-220. For example, if restore list 468 is stored in mobile phone 220, then the list may store information related to files backed up from mobile phone 220. A copy of restore list 468 may also be stored in other devices shown in network 200.

Restore list 468 may include a filename field 402" and a file ID field 404". Filename field 402" and file ID field 404" may store information similar to filename field 402 and file ID field 404 in current list 464. Referring to FIG. 4D, restore list 468 lists two filenames: photo4.jpg and photo5.jpg and corresponding file IDs of 45612 and 56123.

Current list 464, backup list 466, and restore list 468 may include additional, different, or fewer fields than illustrated in FIGS. 4B through 4D. For example, these lists may include one or more fields indicating the date and time the file was created and/or modified. In addition, these lists may list hundreds, if not thousands of filenames. In another embodiment, current list 464, backup list 466, and/or restore list 468 may omit the filename field (e.g., include only the file ID field), for example.

Figure 5A:
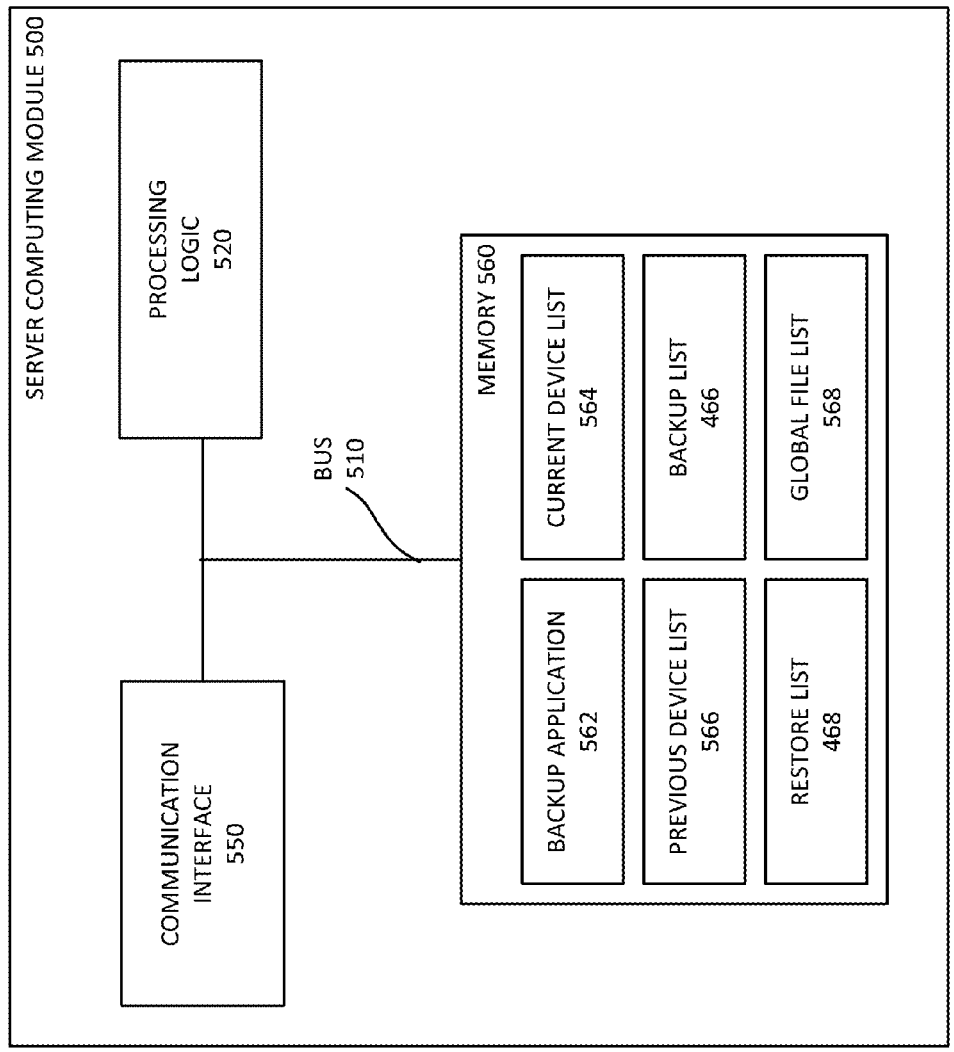
FIG. 5A is a block diagram of exemplary components of a server computing module.

As discussed above, content layer 204 and proxy layer 206 may include one or more servers. FIG. 5A is a block diagram of exemplary components of a server computing module 500. Each of devices in content layer 204 and/or proxy layer 206 may include one or more server computing modules (e.g., a rack of server computer modules), such as computing module 500. Server computing module 500 may include a bus 510, processing logic 520, a communication interface 550, and a memory 560. Server computing module 500 may include other components (not shown) that aid in receiving, transmitting, and/or processing data. Moreover, other configurations of components in module 500 are possible.

Bus 510 may include a path that permits communication among the components of module 500. Processing logic 520 may include any type of processor or microprocessor (or groups of processors or microprocessors) that interprets and executes instructions. In other embodiments, processing logic 520 may include an ASIC, an FPGA, or the like.

Communication interface 550 may allow module 500 to communicate with other devices and/or systems. Communication interface 550 may include a transmitter that may convert baseband signals from processing logic 520 to RF signals and/or a receiver that may convert RF signals to baseband signals. Communication interface 550 may include a transceiver to perform functions of both a transmitter and a receiver. Communication interface 550 may be coupled to an antenna for transmission and reception of the RF signals. Communications interface 550 may include a network interface card, e.g., Ethernet card, for wired communications or a wireless network interface (e.g., a WiFi card) for wireless communications. Communication interface 550 may also include, for example, a USB port for communications over a cable, a Bluetooth™ wireless interface for communicating with Bluetooth™ devices, a NFC interface, etc. Communication interface 550 may implement a wireless communication protocol, e.g., GSM, CDMA, WCDMA, GPRS, EDGE, etc. Communications interface 550 may receive, transmit and/or process digital or analog audio inputs/outputs and/or digital or analog video inputs/outputs.

Memory 560 may include a RAM or another type of dynamic storage device that may store information and instructions, e.g., an application (e.g., backup application 562) for execution by processing logic 520 and application data (e.g., current device list 564, previous device list 566, backup list 466, restore list 468, and/or global file list 568); a ROM device or another type of static storage device that may store static information and instructions for use by processing logic 520; and/or some other type of magnetic or optical recording medium and its corresponding drive, e.g., a HDD, for storing information and/or instructions.

Module 500 may perform certain operations, as described in detail below. Module 500 may perform these operations in response to processing logic 520 executing software instructions contained in a computer-readable medium, such as memory 560. The software instructions may be read into memory 560 from another computer-readable medium or from another device via communication interface 550. The software instructions contained in memory 560 may cause processing logic 520 to perform processes that are described below.

FIGS. 5B through 5D are diagrams of exemplary data structures stored in the server computing module 500. For example, as discussed above, module 500 may include (e.g., in memory 560) a current device list 564, a previous device list 566, backup list 466, restore list 468, and/or global file list 568. Backup list 466 and restore list 468 are described above. FIG. 5B is a block diagram of an exemplary current device list 564; FIG. 5C is a block diagram of exemplary previous device list 566; and FIG. 5D is a block diagram of exemplary global file list 568.

Current device list 564 may store information related to files currently stored in a group of devices. Previous device list 566 may store information related to files that have been copied from a group of devices to backup server 234-x, for example. Previous device list 566 may also indicate files that may be restored or copied to devices. Global file list 568 may store the file IDs of the files stored in backup server 234-x and the location of where the corresponding file is stored. Entries (e.g., records) in each of lists 564, 566, and/or 568 may each include information regarding a different file for a different device. Lists 564, 566, and/or 568 may be stored in proxy server 254 and/or backup server 234-x. A copy of current device list 564 may also be stored in other devices shown in network 200.

Referring to FIG. 5B, current device list 564 may include a device number field 501, filename field 502, and a file ID field 504. Device number field 501 may store the device number (e.g., phone number, mobile number, URI, or URL) of the user device (e.g., mobile phone 220) for which the corresponding files in file name field 502 correspond. Referring to FIG. 5B, current device list 564 stores information related to two device numbers: 202.251.0808 and 202.251.0809.

Filename field 502 may identify the names of files stored in the corresponding user device, such as mobile phone 220. Referring to FIG. 5B, current device list 564 lists three filenames for the device with number 202.251.0808: photo1.jpg, photo2.jpg, and photo3.jpg. Current device list 564 also lists one filename for the device with number 202.251.0809: Star_Trek.mov File ID field 504 may identify or address the file specified in the corresponding filename field 502. As with file ID field 404, file ID field 504 may specify a hash value of the file identified in filename field 502. In one embodiment, file ID field 504 may uniquely identify the file in filename field 502, but identical files may have the same file ID. Referring to FIG. 5B, three file IDs are listed for the device with number 202.251.0808: 86542 for photo1.jpg, 69823 for photo2.jpg, and 69854 for photo3.jpg. A single file ID is listed for the device with number 202.251.0809: 69860 for Star_Trek.mov. These values are exemplary and in some implementations may be very long alphanumeric strings.

Previous device list 566 may include a device number field 501', filename field 502', and a file ID field 504'. Device number field 501', filename field 502', and file ID field 504' may store information similar to device number field 501, filename field 502, and file ID field 504 of current device list 564. For example, referring to FIG. 5C, previous device list 566 stores information related to two device numbers: 202.251.0808 and 202.251.0809.

Global file list 568 may include a file ID field 512 and a file location field 514. File ID field 512 may identify or address the file having the matching file ID. As with file ID fields 404 and 504, file ID field 512 may specify a hash value of the file located in the corresponding file location field 514. File location field 514 may store the location of the file having the corresponding file ID identified in file ID field 512. The file location may be indicated by an address to a disk drive, for example.

Because the file ID is unique to the file, if backup server 234-x encounters two identical files, backup server 234-x may realize this by noting that a file with the same file ID (indicated in file ID field 512) is already stored in a location (indicated by file location field 514). Thus, in one embodiment, duplicate files do not have to be stored twice. In another embodiment, files may be stored twice and, for example, indexed by device number.

Lists 564, 566, and 568 may include additional, different, or fewer fields than illustrated. For example, lists 564, 566, and 568 may each include one or more fields indicating the date and time the file was created and/or modified. In addition, lists 564, 566, and/or 568 may list hundreds, if millions of device numbers and filenames. In another embodiment, current device list 564 and/or previous device list 566 may omit the filename field (e.g., include only the device number field and the file ID field).

Figure 6:
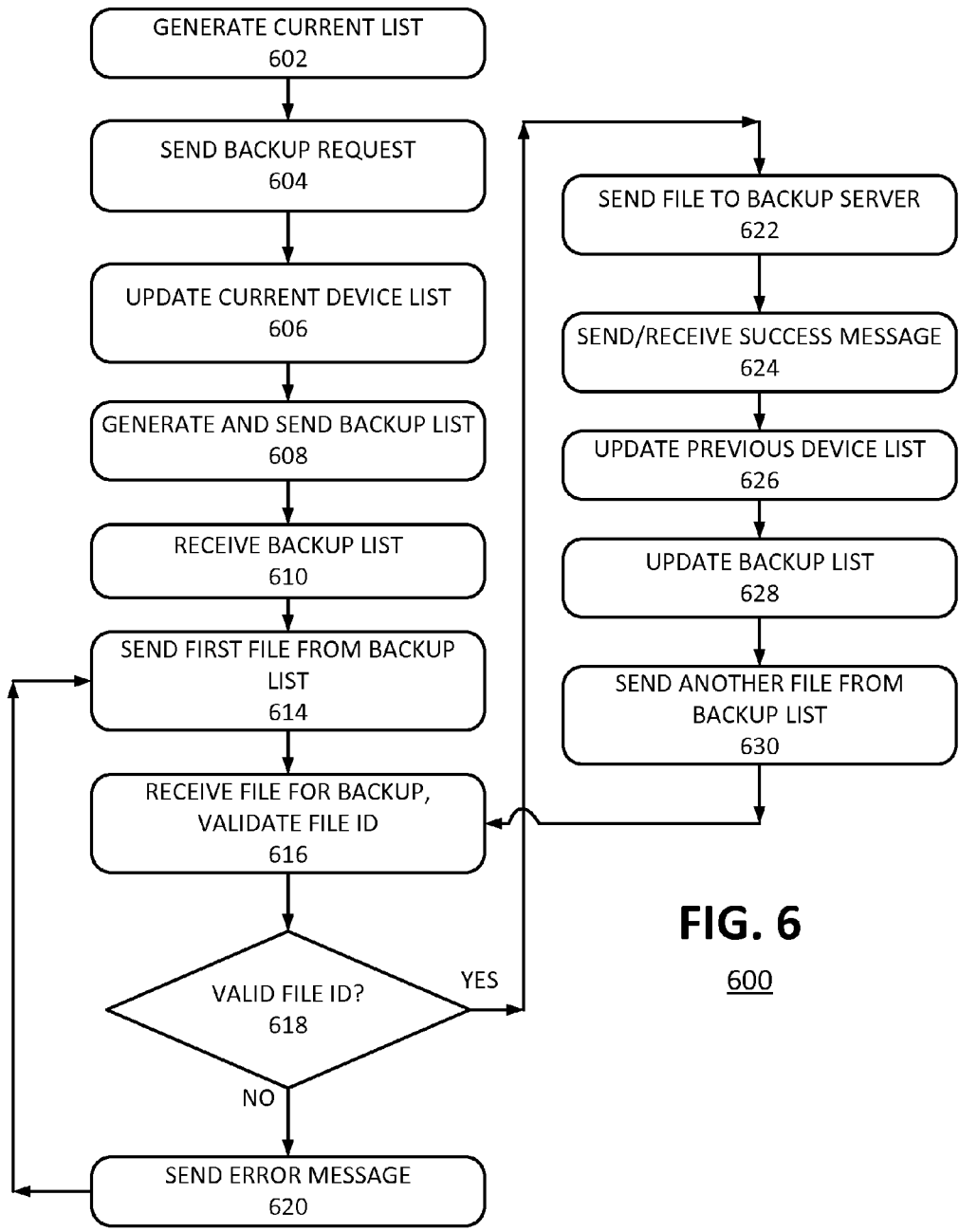
FIG. 6 is a flowchart of an exemplary process for backing up files in a user device.

As discussed above, files stored in a user device may be backed up or copied to backup server 234-x. FIG. 6 is a flowchart of a process 600 for backing up (or copying) files stored in a user device. Portions of process 600 may be performed in a user device (e.g., mobile phone 220), proxy server 254, and/or backup server 234-x. Process 600 is described below with respect to FIG. 7, which is a signal diagram of exemplary messages sent between devices in network 200.

Figure 7:
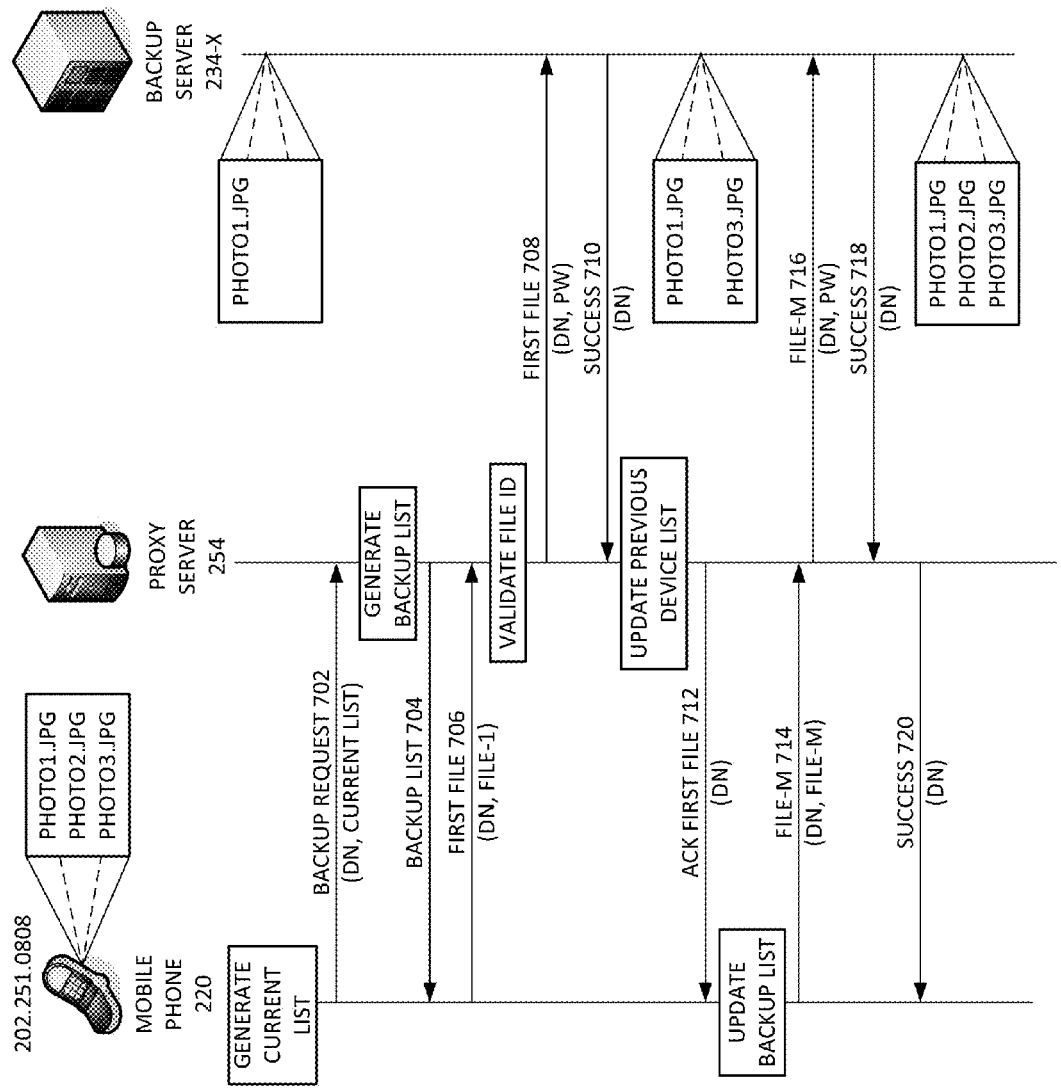
FIG. 7 is a diagram of exemplary network signals sent and received during the process of FIG. 6.

In the example of FIG. 7, mobile phone 220 has the device number of 202.251.0808. In addition, mobile phone 220 currently stores three files for backing up: photo1.jpg, photo2.jpg, and photo3.jpg. In this case, mobile phone 220 may store current list 464 as shown in FIG. 4B. Mobile phone 220 may determine what files to backup based on input from a user (e.g., instructions to backup all files in a device or files in a particular folder). One of these files (photo1.jpg) has previously been backed up to backup server 234-x. Since photo1.jpg has already been saved to backup server 234-x, proxy server 254 and/or backup server 234-x may store previous device list 566 as it appears in FIG. 5C with respect to device number 202.251.0808. If, on the other hand, mobile phone 220 had no files backed up, then there may be no entries in previous device list 566 for the device with the number 202.251.0808, for example.

A current list may be generated (block 602) by, for example, a user device. In the example of FIG. 7 described above, mobile phone 220 has three files for backup: photo1.jpg, photo2.jpg, and photo3.jpg. In this case, mobile phone 220 may generate current list 464 as shown in FIG. 4B. A backup request may be sent (block 604) from, for example, the user device. Referring to FIG. 7, a backup request message 702 may be sent from mobile phone 220 to proxy server 254. Backup request message 702 may include current list 464 and the device number (DN) associated with mobile phone 220. In one embodiment, the backup request may be sent from proxy server to the user device and the user device may return, for example, current list 464.

The current device list may be updated (block 606). In the example of FIG. 7, proxy server 254 may update current device list 564 so that it appears as it does in FIG. 5B. In this case, the entries for mobile phone 220 (e.g., device number 202.251.0808) in current device list 564 are the same as in current list 464 received in backup request message 702. A backup list (e.g., backup list 466) may be generated and sent (block 608). As shown in FIG. 7, a backup list message 704 (e.g., including backup list 466) is sent from proxy server 254 to mobile phone 220. In one embodiment, the backup list may be generated by comparing the current device list (for a particular device number) with the previous device list (for the same device number). For example, comparing current device list 564 to previous device list 566 for device number 202.251.0808 reveals that the files with the filename "photo2.jpg" (file ID 69823) and "photo3.jpg" (file ID 69854) have not been backed up to backup server 234-x. In this case, backup list 466 as it appears in FIG. 4C may be generated and sent to mobile phone 220 (as message 704).

In one embodiment, backup list 466 may be generated in proxy server 254. In this embodiment, the comparison of current device list 564 (or current list 464) with previous device list 566 (or a portion of it) may also be performed by proxy server 254. Proxy server 254 may request previous device list 566 from backup server 234-*x*, for example, before the comparison. In this embodiment, backup server 234-*x* may be saved from performing the comparison. Because there may be many proxy servers 254 (e.g., proxy servers distributed across a nation, for example, where the closest proxy server to mobile phone 220 is employed), process 600 may be widely distributed. Thus, in this embodiment, process 600 may be performed faster than if not distributed, for example. In another embodiment, backup list 466 may be generated in the user device (e.g., mobile phone 220) or backup server 234-*x*.

The backup list may be received (block 610) by, for example, the user device. Referring to FIG. 7, backup list 466 (as message 704) is received by mobile phone 220. In this embodiment, new (since the previous backup) or changed files stored in mobile phone 220 may be listed in backup list 466. A file listed in the backup list may be sent (block 614) from, for example, the user device. Referring to FIG. 7, mobile phone 220 may send a first file message 706 with the filename "photo3.jpg" to proxy server 254. The file may be received and the file ID may be validated (block 616). Validating the file ID may ensure that the file was received from mobile phone 220 without error. In one embodiment, validating may help compensate for a poor communication channel that introduces errors in the file during transmission. In the current example, proxy server 254 may calculate what should be the file ID (e.g., calculate the hash value of the received file) and may compare the calculated value to the file ID stored in current device list 564. For example, if mobile phone 220 sends the file with filename "photo3.jpg," then the calculated value should be 69854 as indicated in current device list 564.

If the file ID is not valid (block 618: NO), an error message (not shown) may be sent (block 620) and the first file may be resent (block 614). For example, proxy server 254 may send an error message (not shown) to mobile phone 220 and mobile phone 220 may resend first file message 706 to proxy server 254. In this embodiment, if a file is not transferred properly between mobile phone 220 and proxy server 254, then mobile phone 220 does not have to restart process 600 from the beginning. Rather, mobile phone 220 may restart process 600 from block 614. Further, if the file ID is verified in proxy server 254, then an error message may be sent to mobile phone 220 before the file is sent to backup server 234-*x*. In this embodiment, the resources of backup server 234-*x* and the link between proxy server 254 and backup server 234-*x* are not wasted carrying and storing bad data. Further, this embodiment allows for a recovery if the communication link between, for example, mobile phone 220 and proxy server 254 is intermittent and/or unreliable.

If the file ID is valid (block 618: YES), then the file may be sent to a backup server (block 622). In one embodiment, backup server 234-*x* may store and index files according to a file IDs. As shown in FIG. 5D, global file list 568 lists file locations according to file IDs. In this embodiment, if a file (e.g., photo4.jpg or photo5.jpg) are already stored in backup server 234-*x*, then identical files do not have to be stored multiple times. In another embodiment, backup server 234 may store duplicate files.

A success message may be sent and received (block 624). Referring to FIG. 7, a success message 710 may be sent from backup server 234-*x* to proxy server 254 indicating that the file was successfully received by backup server 234. A success message 712 may also be sent from proxy server 254 to mobile phone 220 indicating that the file was successfully received. The previous device list may be updated (block 626) by, for example, the proxy server. FIG. 8A shows an exemplary previous device list 566' after having been updated. As shown, for the device with number 202.251.0808, list 566' indicates that the file with the filename "photo3.jpg" and the file ID of 69854 has been successfully copied to backup server 234-*x*.

The backup list may be updated (block 628) in, for example, the user device. FIG. 8B shows an exemplary backup list 466' after having been updated by mobile phone 220 from the state shown in FIG. 4 as backup list 466. As shown in backup list 466', photo2.jpg with a file ID of 69283 remains to be copied to backup server 234-*x*. Process 600 may then continue, and another file listed in the backup list may be sent (block 630). As shown in FIG. 7, mobile phone 220 may send the Mth file (message 714) to proxy server 254. If the file ID is valid (block 618), then proxy server 254 may send file M (message 716) to backup server 234-*x*. A success message 718 may be sent from backup server 234-*x* to mobile phone 220, which may be forwarded to mobile phone 220 (e.g., message 720). In other words, process 600 may continue until all the files in backup list 466 have been copied to backup server 234-*x*.

Figure 9:
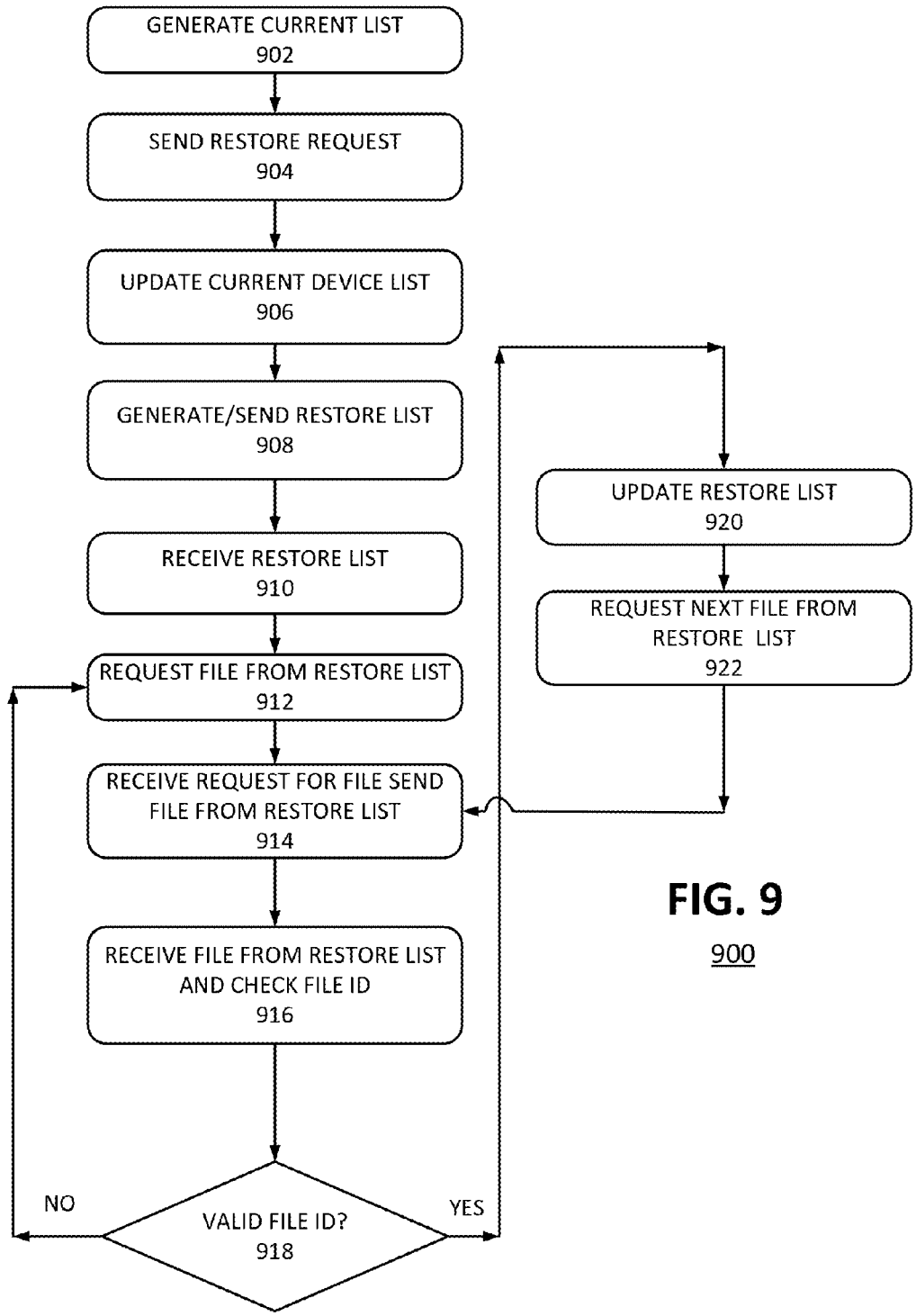
FIG. 9 is a flowchart of an exemplary process for restoring files in a user device.
Figure 10:
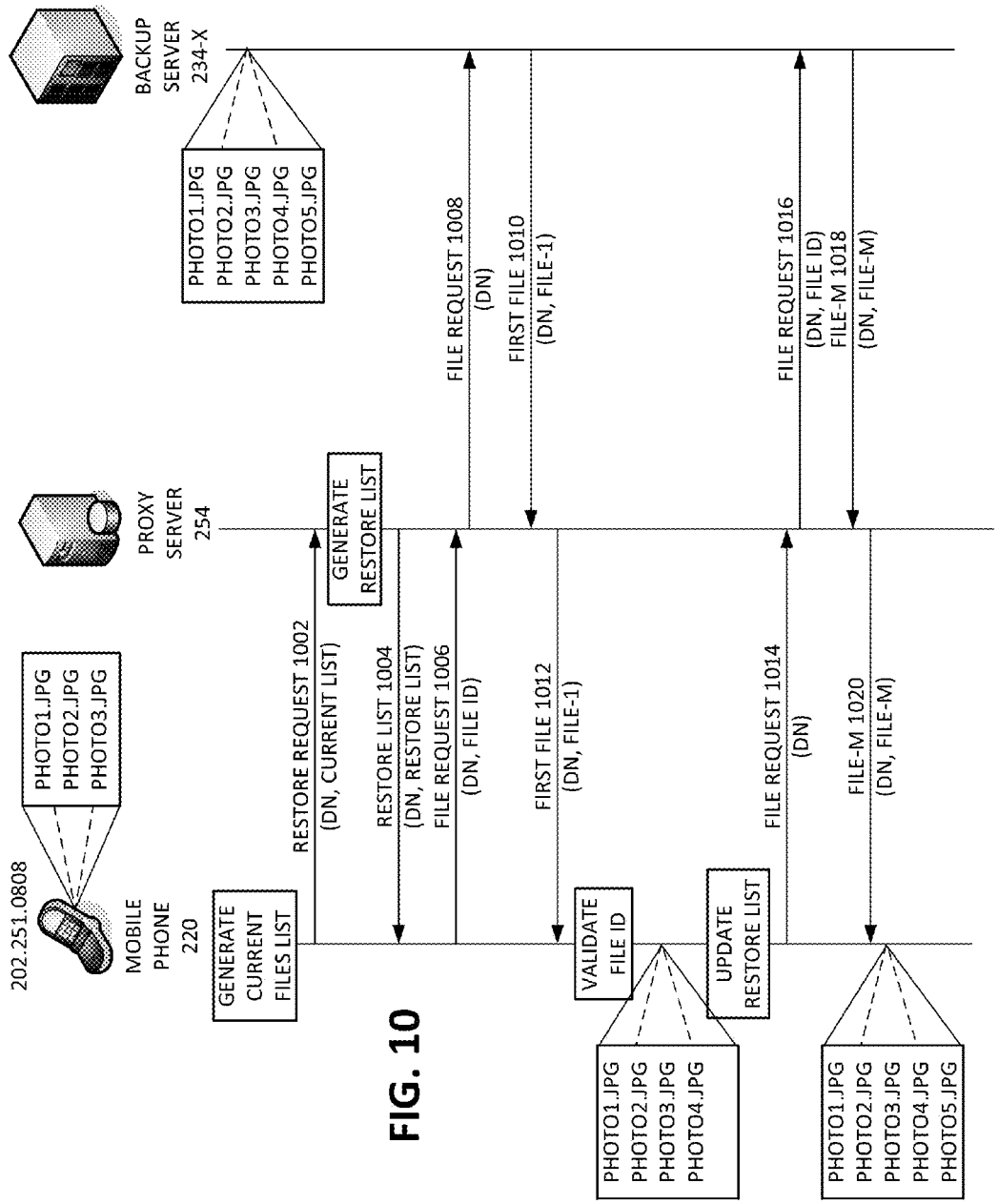
FIG. 10 is a diagram of exemplary network signals sent and received during the process of FIG. 9.

Once files are backed up or copied, they may be restored if, for example, a user accidentally deletes files, if the user replaces the device's memory, or if the user replaces the user device with a new user device with the same device number. FIG. 9 is a flow chart of a process 900 for restoring files to a user device. Portions of process 900 may be performed in a user device (e.g., mobile phone 220), proxy server 254, and/or backup server 234-*x*. Process 900 is described below with respect to FIG. 10, which is a signal diagram of exemplary messages sent between devices in network 200. In the example of FIG. 10, mobile phone 220 has the device number of 202.251.0808. In addition, mobile phone 220 includes three files: photo1.jpg, photo2.jpg, and photo3.jpg, which have previously been backed up to backup server 234-*x*. The user has accidentally deleted two files, however: photo4.jpg and photo5.jpg. Fortunately for the user, these two files were previously saved to backup server 234-*x*. Because photo4.jpg and photo5.jpg have been saved to backup server 234-*x*, proxy server 254 and/or backup server 234-*x* may store previous device list 566" as it appears in FIG. 11A. Process 900, described below, may restore photo4.jpg and photo5.jpg to mobile phone 220.

A current list may be generated (block 902) by, for example, a user device. In the example of FIG. 10, mobile phone 220 may generate current list 464 as it appears in FIG. 4B. List 464 indicates that mobile phone 220 is currently storing the following three files: photo1.jpg, photo2.jpg, and photo3.jpg.

A restore request may be sent (block 904). As shown in FIG. 10, mobile phone 220 may send restore request message 1002. Request message 1002 may include the device number (DN) of mobile phone 220 and current files 464 generated, for example, in block 902. The restore request may be received and a current device list may be updated (block 906). Referring to FIG. 10, proxy server 254 may receive restore request message 1002 and updates current device list 564 to appear as it does in FIG. 5B, e.g. listing the following three files: photo1.jpg, photo2.jpg, and photo3.jpg.

A restore list may be generated and sent (block 908) to, for example, the user device. Proxy server 254 may compare current device list 564 (FIG. 5B) to previous device list 566" (FIG. 11A). As indicated above, previous device list 566" indicates that five files were previously backed up. Proxy server 254 may generate restore list 468 as it appears in FIG. 4D. As shown, restore list 468 indicates that photo4.jpg and photo5.jpg may be restored to mobile phone 220. As shown in FIG. 10, restore list message 1004 (including restore list 468) may be sent from proxy server 254 to mobile phone 220.

In one embodiment, restore list 468 may be generated in proxy server 254. In this embodiment, the comparison of current device list 564 (or current list 464) with previous device list 566 (or a portion of it) may also be performed by proxy server 254. Proxy server 254 may request previous device list 566 from backup server 234-x, for example, before the comparison. In this embodiment, backup server 234-x may be saved from performing the comparison. Because there may be many proxy servers 254 (e.g., proxy servers distributed across a nation, for example, where the closest proxy server to mobile phone 220 is employed), process 900 may be widely distributed. Thus, in this embodiment, process 600 may be performed faster than if not distributed, for example. In another embodiment, restore list 468 may be generated in the user device (e.g., mobile phone 220) or in backup server 234-x.

The restore list may be received (block 910) by, for example, the user device. In the example of FIG. 10, mobile phone 220 may receive message 1004 and restore list 468, for example. A file may be requested from the restore list (block 912). Mobile phone 220 may send a file request message 1006 for a file listed in restore list 468 (e.g., photo4.jpg), to proxy server 254. In one embodiment, file request message 1006 may include the file ID of the requested file (e.g., 45612).

The request may be received and the file sent (block 914) to, for example, the user device. Proxy server 254 may receive file request message 1006 (e.g., for photo4.jpg) and may send a file request message 1008 to request the file from backup server 234-x. In one embodiment, file request message 1008 may include the file ID of the requested file (e.g., 45612 for photo4.jpg). In this embodiment, backup server 234-x may retrieve the file according to its file ID. Backup server 234-x may return the requested file in message 1010 to proxy server 254 (e.g., photo4.jpg). Proxy server 254 may send the requested file (e.g., photo4.jpg) in message 1012 to mobile phone 220.

The file may be received and the file ID may be checked (block 916) by, for example, the user device. In the example of FIG. 10, mobile phone 220 may receive message 1012 including the requested file (e.g., photo4.jpg). Mobile phone 220 may calculate the file ID (e.g. hash value) and compare it to the hash value for the file stored in current list 464. If the file ID is not valid (block 918: NO), then the request may be repeated (block 912) until the file is correctly received.

In this embodiment, if a file is not transferred properly between proxy server 254 and mobile phone 220, then mobile phone 220 does not have to restart process 900 from the beginning. Rather, mobile phone 220 may restart process 900 from block 912. Further, if the file is cached in proxy server 254 (e.g., in cache 255), then a resending of the file may burden proxy server 254 (e.g., one of many distributed proxy servers) and, in this embodiment, not backup server 234-x. Thus, the resources of backup server 234-x and the link between proxy server 254 and backup server 234-x are not wasted carrying and storing redundant data. Further, this embodiment allows for a recovery if the communication link between, for example, mobile phone 220 and proxy server 254 is intermittent and/or unreliable.

If the file ID is valid (block 918: YES), then the restore list may be updated (block 920). In the example of FIG. 10, mobile phone 220 may update the restore list so that it appears as restore list 468' as in FIG. 11B. As shown, only one file remains for mobile phone 220 to restore (e.g., photo5.jpg) and one filename has been removed (e.g., photo4.jpg).

The next file in the restore list may be requested (block 922). In the example of FIG. 10, mobile phone 220 may send a file request message 1014 for the next file (e.g., the Mth file). In this case, blocks 914, 916, and 918 may be repeated until all files are safely received in mobile phone 220. Generally, proxy server 254 may request file M (message 1016) from backup server 234-x. Backup server 234-x may return file M (message 1018), which may be forwarded to mobile phone 220 as message 1020.

Figure 12A:
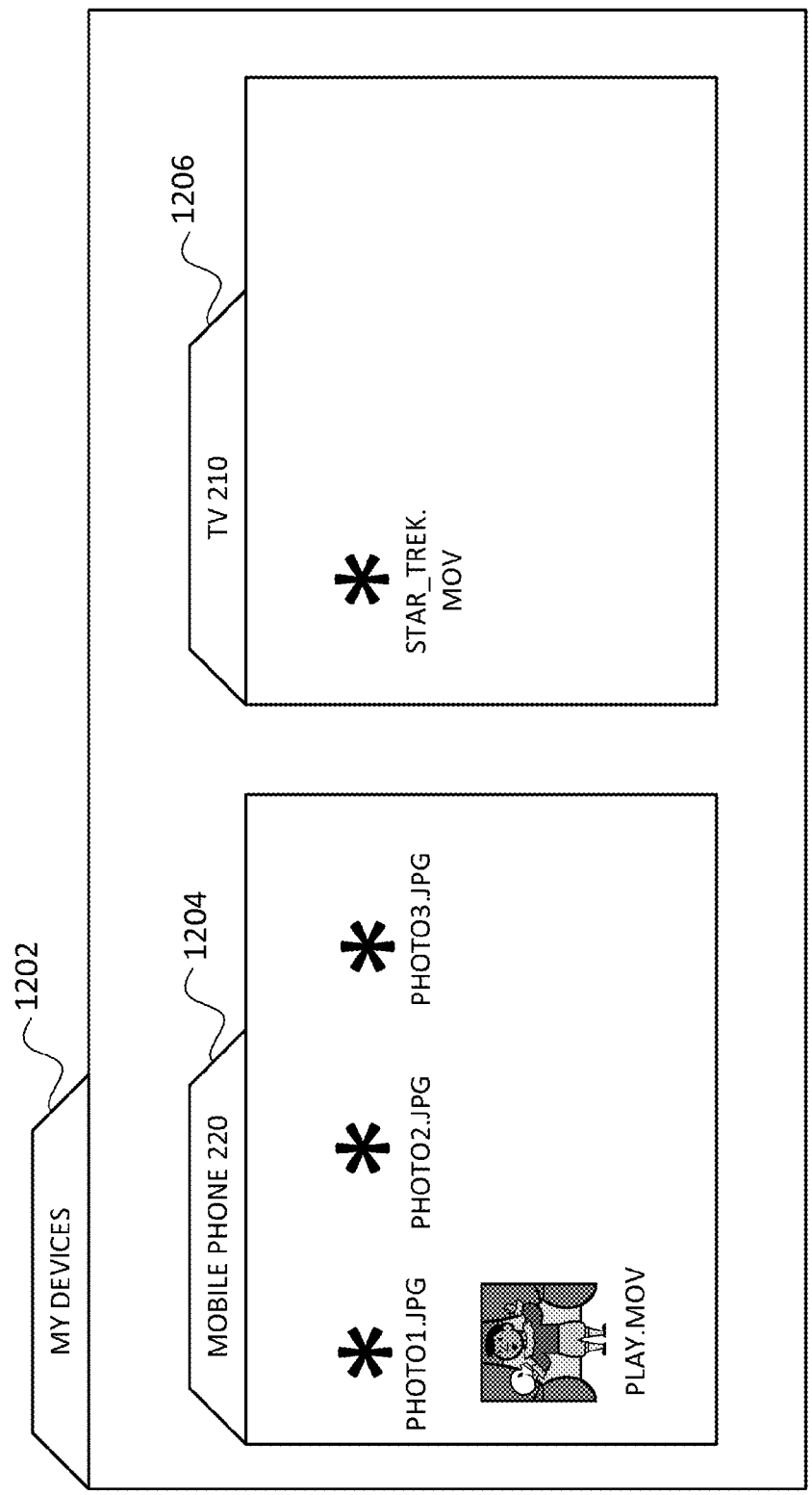
FIGS. 12A and 12B are diagrams of an exemplary browser interface for navigating files stored in the backup server of FIG. 2.

In one embodiment, a user may browse the files and folders (e.g., using computer 208) backed up to backup server 234-x and associated with his or her devices. For example, as shown in FIG. 12A, a MY DEVICES folder 1202 may include a MOBILE PHONE 220 folder 1204 and a TV 210 folder 1206. As shown in MOBILE PHONE 220 folder 1204, backup server 234-x stores photo1.jpg, photo2.jpg, and photo3.jpg, consistent with a previous device list 1302 shown in FIG. 13. The user of mobile phone 220, however, also recorded a school play (play.mov) with mobile phone 220 and subsequently backed up the play (play.mov) to backup server 234-x. Thus, MOBILE PHONE 220 folder 1204 shows play.mov as a file as well, consistent with previous device list 1302. Further, in this example, TV 210 folder 1206 includes Star_Trek.mov. Star_Trek.mov was backed up from TV 210 previously, also consistent with previous device list 1302.

Figure 14:
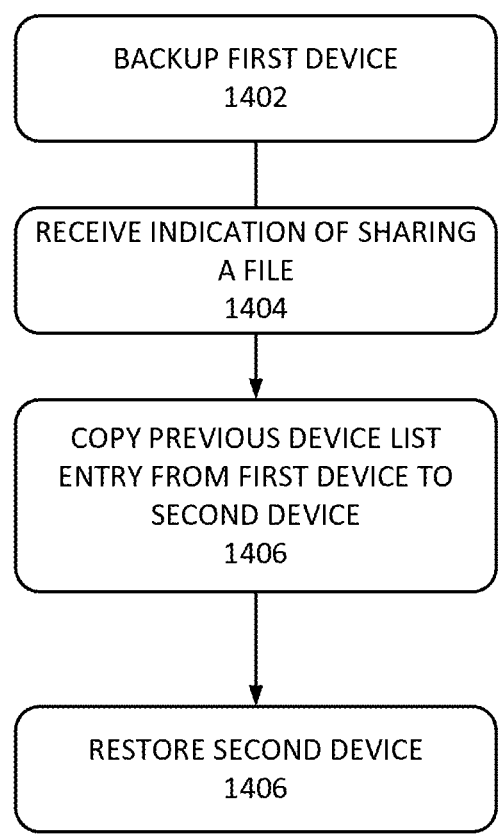
FIG. 14 is a flowchart of an exemplary process for sharing files among devices in FIG. 2.

In one embodiment, a user may share files between a first device and a second device. For example, a user may wish to share the file play.mov between mobile phone 220 (a first device) and TV 210 (a second device). In this example, mobile phone 220 may be associated with the device number (DN) of 202.251.0808 and TV 210 may be associated with the device number (DN) of 202.251.0809. FIG. 14 is a flowchart of a process 1400 for sharing files between devices. FIG. 14 is described with respect to FIGS. 12B and 13.

Figure 12B:
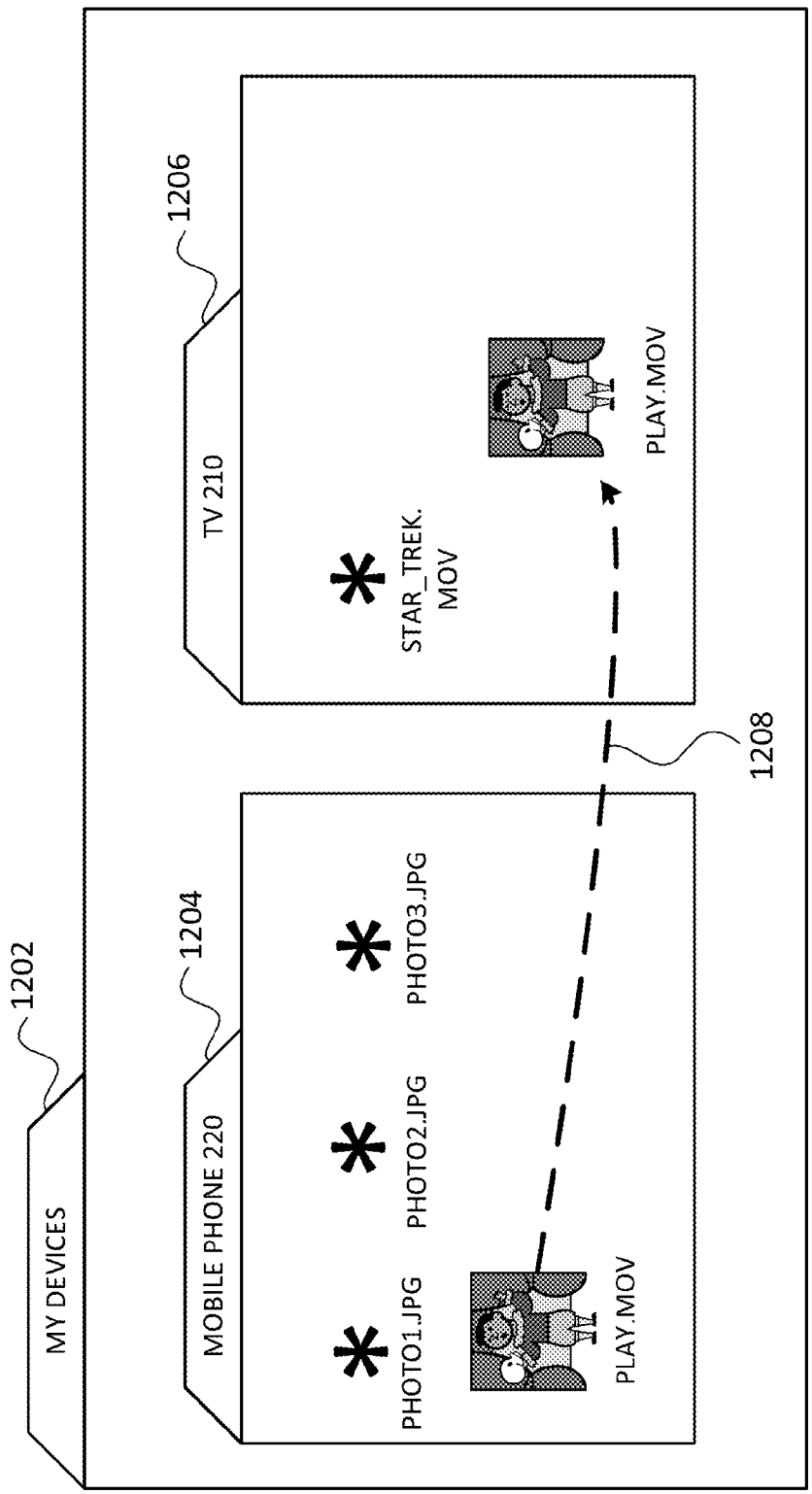

Process 1400 may begin with the first device being backed up (block 1402). For example, the user may backup mobile phone 220 so that play.mov appears in MOBILE PHONE 220 folder 1204 shown in FIG. 12A. An indication of the sharing of a file may be received (block 1404). In the example of FIG. 12B, as shown by arrow 1208, the user may use a mouse, for example, to "click and drag" (or otherwise indicated a transfer or sharing of) the icon representing the file play.mov from MOBILE PHONE 220 folder 1204 to TV 210 folder 1206. This mouse gesture may indicate that the user wishes to share play.mov with TV 210 so that he, for example, can watch play.mov on TV 210 rather than just mobile phone 220.

The entry in the previous device list corresponding to the file may be copied from the first device record to the second device record (block 1406). As shown in FIG. 13, the play.mov entry in previous device list 1302 is copied from the record associated with mobile phone 220 (e.g., the record with device number 202.251.0808) to the record associated with TV 210 (e.g., the record with device number 202.251.0809). The second device may be restored (block 1406). In the example of FIGS. 12B and 13, when TV 210 is restored, then play.mov will be copied from backup server 234-x to TV 210. Thus, the file play.mov is shared between mobile phone 220 and TV 210.

Process 1400 may also be used, for example, to share content between TV 210 and mobile phone 220. In this example, however, mobile phone 220 may not have the storage capacity, processing power, or display resolution to properly play the file Star_Trek.mov. In this embodiment, proxy server 254 may send the file Star_Trek.mov to transcoding server 270 to create a new file encoded according to the capabilities of mobile phone 220. Proxy server 254 may query user profile server 236 and/or billing/provisioning server 238 for the capabilities of mobile phone 220, for example.

As discussed above, in one embodiment, proxy layer 206 may include a memory-less or state-less layer. Any data or states stored in proxy layer 206, if lost, may be received from other layers and/or re-determined. In this embodiment, proxy layer 206 may act as a pass-through for device layer 202 and content layer 204. This embodiment may increase reliability. Proxy layer 206, however, may store data and/or states for redundancy and to improve performance. For example, if proxy layer 206 loses device information (e.g., a password, device number, cookie, name, etc.) it may receive this data from a user device.

In the embodiments described above, a user device may copy or backup files to a server. The user device may then restore the files from the server. Further, files may be shared between devices and transcoded where appropriate.

In the preceding specification, various preferred embodiments have been described with reference to the accompanying drawings. For example, in some embodiments the user device may not be authenticated. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As the term is used herein, "to backup" means to "to copy." While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   generating a list of current files stored in a user device, wherein the list of current files includes unique file identifiers, each associated with a corresponding one of the current files;
   sending the list of current files from the user device to one of a plurality of proxy devices, wherein the one of the plurality of proxy devices is selected based on a proximity of each of the plurality of proxy devices to the user device;
   receiving, at the user device, a copy list generated by the one of the plurality of proxy devices by comparing the list of current files to a list of previously copied files including unique file identifiers, each associated with a corresponding one of the previously copied files;
   sending, via a first communication link, the files listed in the copy list from the user device to the one of the plurality of proxy devices, wherein the first communication link introduces no errors into first ones of the sent files and introduces one or more errors into second ones of the sent files, and wherein the one of the plurality of proxy devices transmits the first ones of the sent files determined at the one of the plurality of proxy devices to be valid and not the second ones of the sent files determined at the one of the plurality of proxy devices to be invalid, via a second communication link to a backup network device separate from the plurality of proxy devices;
   receiving, from the one of the plurality of proxy devices, an error message indicative of the second ones of the sent files determined at the one of the plurality of proxy devices to be invalid based on the one or more errors;
   recovering, responsive to the error message, the first communication link; and
   resending, via the recovered first communication link, the second ones of the sent files to the one of the plurality of proxy devices, wherein the one of the plurality of proxy devices transmits the re-sent files via the second communication link to the backup network device.

2. The method of claim 1, further comprising:
   receiving the list of current files from the user device in the one of the plurality of proxy devices;
   receiving the list of previously copied files in the one of the plurality of proxy devices from the backup network device;
   comparing, in the one of the plurality of proxy devices, the list of current files to the list of previously copied files, wherein the list of previously copied files is associated with the user device, and wherein identical files have identical file identifiers;
   generating, in the one of the plurality of proxy devices, the copy list based on the comparison; and
   sending the copy list from the one of the plurality of proxy devices to the user device.

3. The method of claim 2, further comprising:
   receiving the files sent from the user device in the one of the plurality of proxy devices;
   storing the received files in the one of the plurality of proxy devices; and
   updating the list of previously copied files to indicate that the files received from the user device are stored in the one of the plurality of proxy devices.

4. The method of claim 3, wherein a first user device includes the user device, the method further comprising:
   duplicating a unique file identifier from the list of previously copied files to a second list of previously copied files associated with a second user device different than the first user device.

5. The method of claim 4, further comprising:
   sending, to the second user device, the file associated with the unique file identifier copied to the second list.

6. The method of claim 1, further comprising:
   receiving, in the user device, an indication that the first ones of the sent files were successfully received in the one of the plurality of proxy devices.

7. The method of claim 1,
wherein the unique file identifier associated with each of the current files includes a hash value of the associated file, and
wherein the unique file identifier associated with each of the previously copied files includes a hash value of the associated file.

8. The method of claim 1, further comprising:
selecting another one of the plurality of proxy devices when the user devices moves and the proximity of the user device to the other one of the plurality of devices is less than the proximity of the user device to the one of the plurality of proxy devices.

9. The method of claim 8, wherein the plurality of proxy devices are geographically distributed.

10. The method of claim 1, wherein each of the plurality of proxy devices implements a state-less protocol when communicating with the user device.

11. A system comprising:
a processor to select one of a plurality of proxy network devices based on a proximity of each of the plurality of network devices to a user device;
wherein each of the plurality of proxy network devices includes:
a receiver to receive, via a first communication link, a plurality of files from the user device, wherein the first communication link introduces no errors into some of the sent files and introduces one or more errors into others of the sent files;
a processor to determine which of the plurality of files were received without error and which of the plurality of files were received with the one or more errors; and
a transmitter to:
send an error message to the user device indicative of at least one file of the plurality of files received with the one or more errors, wherein the receiver is further configured to receive, responsive to the error message, the at least one file re-sent from the user device via the first communication link; and
send each of the plurality of files received without error and the re-sent at least one file, and none of the plurality of files received with the one or more errors, to a second network device, different from the plurality of proxy network devices, via a second communication link for storage.

12. The system of claim 11,
wherein the receiver is configured to receive, from the user device, a list of current files wherein the list of current files includes unique file identifiers, each associated with a corresponding one of the current files;
wherein the processor in each proxy is further configured to compare the list of current files to a list of previously copied files, wherein the list of previously copied files includes unique file identifiers, each associated with a corresponding one of the previously copied files, and wherein the list of previously copied files is associated with the user device;
generate a backup list of files based on the comparison; and
wherein the transmitter is further configured to send the backup list from the proxy network device to the user device.

13. The system of claim 12, further comprising the second network device, wherein the second network device includes:
a receiver to receive the plurality of files;
a memory to store the received plurality of files; and
a processor to update the list of previously copied files to indicate that the files received from the user device are stored in the second network device.

14. The system of claim 12, further comprising the user device,
wherein the unique file identifier associated with each of the current files includes a hash value of the associated file, and
wherein the unique file identifier associated with each of the previously copied files includes a hash value of the associated file.

15. A method comprising:
selecting one of a plurality of proxy network devices based on a proximity of each of the plurality of proxy network devices and a user device;
receiving, in the selected proxy network device from the user device, a list of current files, wherein the list of current files includes unique file identifiers, each associated with a corresponding one of the current files;
comparing, in the selected proxy network device, the list of current files to a list of previously copied files, wherein the list of previously copied files includes unique file identifiers, each associated with a corresponding one of the previously copied files, and wherein the list of previously copied files is associated with the user device;
generating a backup list of files based on the comparison;
sending the backup list from the selected proxy network device to the user device;
receiving, at the selected proxy network device from the user device via a first communication link, files listed in the backup list;
determining, based on errors introduced by the first communication link into some of the received files, which of the received files are valid and which of the received files are invalid;
transmitting, via a second communication link, the valid files and none of the invalid files to a backup network device separate from the plurality of proxy network devices;
sending an error message indicative of the invalid files to the user device; and
receiving, responsive to the error message and via the first communication link, re-sent files corresponding to the invalid files.

16. The method of claim 15, further comprising:
transmitting the re-sent files to the backup network device;
storing the transmitted files in the backup network device; and
updating the list of previously copied files to indicate that the transmitted files are stored in the backup network device.

17. The method of claim 16, wherein a first user device includes the user device, the method further comprising:
duplicating a unique file identifier from the list, associated with the first user device, of previously copied files to a second list, associated with a second user device, of previously copied files, wherein the first user device is different than the second user device.

18. The method of claim 16, further comprising:
generating, in a user device, the list of current files;
sending the list of current files from the user device to the selected proxy network device;
receiving the backup list from the selected proxy network device in the user device; and
sending the files listed in the backup list from the user device to the selected proxy network device.

19. The method of claim 18,
wherein the unique file identifier associated with each of the current files includes a hash value of the associated file; and
wherein the unique file identifier associated with each of the previously copied files includes a hash value of the associated file.

20. The method of claim 15, further comprising:
sending, to the user device, an indication that the transmitted files were successfully received in the selected proxy network device.

21. A system, comprising:
a user device including:
  a memory to store a plurality of files;
  a processor to generate a list of current files stored in the memory device, wherein the list of current files includes unique file identifiers, each associated with a corresponding one of the current files;
  a transmitter to send the list of current files to one of a plurality of proxy network devices, wherein the one of the plurality of proxy network devices is selected based on a proximity of each of the plurality of proxy network devices to the user device; and
  a receiver to receive a backup list generated by comparing the list of current files to a list of previously copied files including unique file identifiers, each associated with a corresponding one of the previously copied files; and
  wherein the transmitter is further configured to:
    send the files listed in the backup list from the user device to the one of the plurality of proxy network devices,
    receive, from the one of the plurality of proxy network devices, an indication that at least one of the sent files was not correctly received at the one of the plurality of proxy network devices, and
    repeat, responsive to the indication, sending of the at least one sent file until an indication that the at least one sent file has been correctly received at the one of the plurality of proxy network devices is received at the user device.

22. The system of claim 21, further comprising the one of the plurality of proxy network devices, the one of the plurality of proxy network devices including:
  a receiver to receive the list of current files from the user device;
  a processor to compare the list of current files to the list of previously copied files, wherein the list of previously copied files is associated with the user device, and to generate the backup list of files based on the comparison; and
  a transmitter to send the backup list from the network device to the user device.

23. The system of claim 22, wherein the receiver of the one of the plurality of network devices is further configured to receive the files sent from the user device, the one of the plurality of network devices further comprising:
  a memory to store the received files, wherein the processor of the network device is further configured to update the list of previously copied files to indicate that the files received from the user device are stored in the network device.

24. The system of claim 23, wherein a first user device includes the user device, wherein the processor of the one of the plurality of network devices is further configured to duplicate a unique file identifier from the list, associated with the first user device, of previously copied files to a second list, associated with a second user device different than the first user device, of previously copied files.

25. The system of claim 21,
wherein the unique file identifier associated with each of the current files includes a hash value of the associated file; and
wherein the unique file identifier associated with each of the previous files includes a hash value of the associated file.

* * * * *